United States Patent
Höber et al.

(10) Patent No.: US 10,855,150 B2
(45) Date of Patent: Dec. 1, 2020

(54) METHOD AND ASSEMBLY DEVICE FOR ASSEMBLING AN ELECTRIC MACHINE

(71) Applicant: THYSSENKRUPP PRESTA TECCENTER AG, Eschen (LI)

(72) Inventors: Raphael Höber, Thüringen (AT); Daniel Paul, Burkhardtsdorf (DE); Jürgen Meusel, Dittmannsdorf (DE)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 257 days.

(21) Appl. No.: 15/754,796

(22) PCT Filed: Aug. 17, 2016

(86) PCT No.: PCT/EP2016/069504
§ 371 (c)(1),
(2) Date: Feb. 23, 2018

(87) PCT Pub. No.: WO2017/036798
PCT Pub. Date: Mar. 9, 2017

(65) Prior Publication Data
US 2018/0254687 A1    Sep. 6, 2018

(30) Foreign Application Priority Data
Sep. 4, 2015 (DE) .................. 10 2015 216 971

(51) Int. Cl.
*H02K 15/03* (2006.01)
*H02K 1/27* (2006.01)
*H02K 15/02* (2006.01)

(52) U.S. Cl.
CPC .......... *H02K 15/03* (2013.01); *H02K 1/2766* (2013.01); *H02K 15/02* (2013.01); *H02K 2201/06* (2013.01)

(58) Field of Classification Search
CPC ...... H02K 15/02; H02K 15/03; H02K 1/2766; H02K 2201/06
See application file for complete search history.

(56) References Cited

U.S. PATENT DOCUMENTS 2,390,170 A    12/1945    Poole
5,774,976 A *   7/1998    Stark .................. H01F 41/0253
                                                     29/732

(Continued)

FOREIGN PATENT DOCUMENTS

CN    103779993 A    5/2014
CN    104638849 A    5/2015
(Continued)

OTHER PUBLICATIONS

English Translation of International Search Report issued in PCT/EP2016/069504, dated Oct. 26, 2016 (dated Nov. 7, 2016).

*Primary Examiner* — Minh N Trinh
(74) *Attorney, Agent, or Firm* — thyssenkrupp North America, LLC

(57) ABSTRACT

A device may be used to assemble a rotor segment of an electric machine. The rotor segment may include a rotor shaft, a laminated core joined to the rotor shaft, and two pressure elements that clamp the laminated core. A method for assembling the rotor segment may involve positioning the rotor shaft in the device and orienting the rotor shaft using an orienting means of the assembly device, positioning the laminated core and at least one of the first or second pressure elements within a clamping means of the device, orienting the laminated core by means of a positioning module of the clamping means, and moving the rotor shaft relative to the clamping means such that the laminated core is pushed onto the rotor shaft and the at least one of the first or second pressure elements is connected to the rotor shaft.

12 Claims, 10 Drawing Sheets

(56) References Cited

U.S. PATENT DOCUMENTS

| | | | | |
|---|---|---|---|---|
| 5,881,448 A * | 3/1999 | Molnar | ............ | H02K 1/278 |
| | | | | 29/598 |
| 7,451,538 B2 * | 11/2008 | Pizzichil | ............ | H02K 15/0012 |
| | | | | 29/596 |
| 2004/0245880 A1 | 12/2004 | Liang | | |
| 2010/0156205 A1 | 6/2010 | Davis | | |

FOREIGN PATENT DOCUMENTS

| | | |
|---|---|---|
| DE | 519745 C | 3/1931 |
| DE | 2415582 A | 10/1975 |
| DE | 10332958 A | 2/2005 |
| DE | 10 2006 060 318 A | 6/2008 |
| DE | 102010031399 A | 1/2012 |
| DE | 10 2011 118 398 A | 5/2012 |
| DE | 102011012429 A | 8/2012 |
| DE | 10 2012 013 879 A | 1/2013 |
| DE | 10 2013 004 119 A | 9/2014 |
| EP | 2860848 A | 4/2015 |
| JP | H08126262 A | 5/1996 |
| JP | H1189186 A | 3/1999 |
| JP | 2004-153962 A | 5/2004 |
| JP | 2004-513792 A | 5/2004 |
| JP | 2005-218194 A | 8/2005 |
| JP | 2009017701 A | 1/2009 |
| JP | 2010252418 A | 11/2010 |
| JP | 2013158076 A | 8/2013 |
| JP | 2014-147191 A | 8/2014 |
| KR | 100832134 B | 5/2008 |

\* cited by examiner

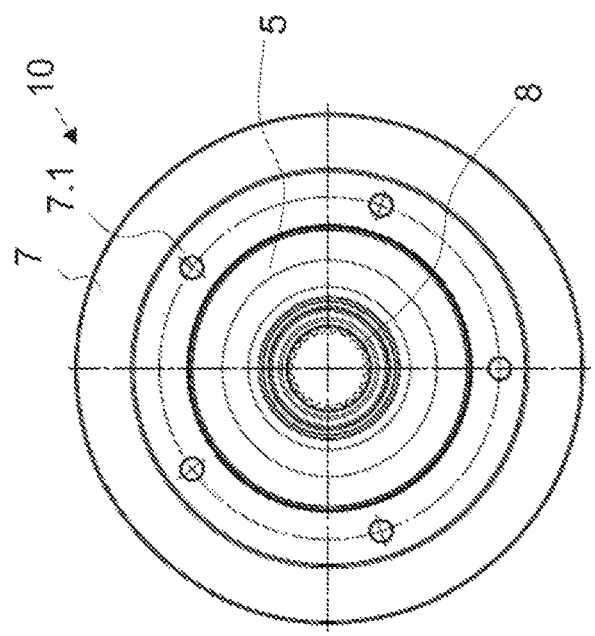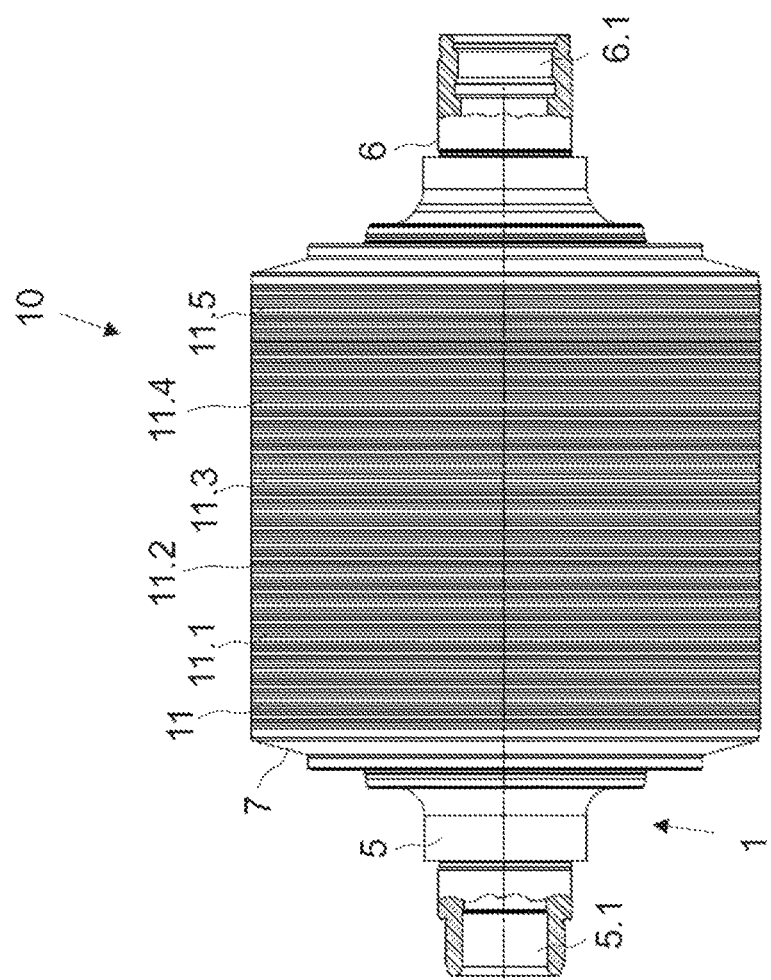

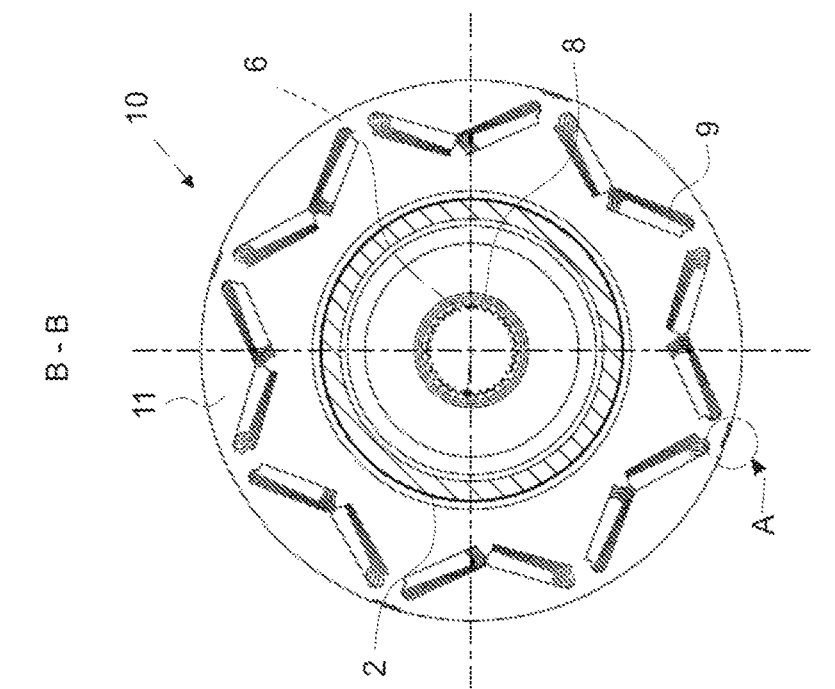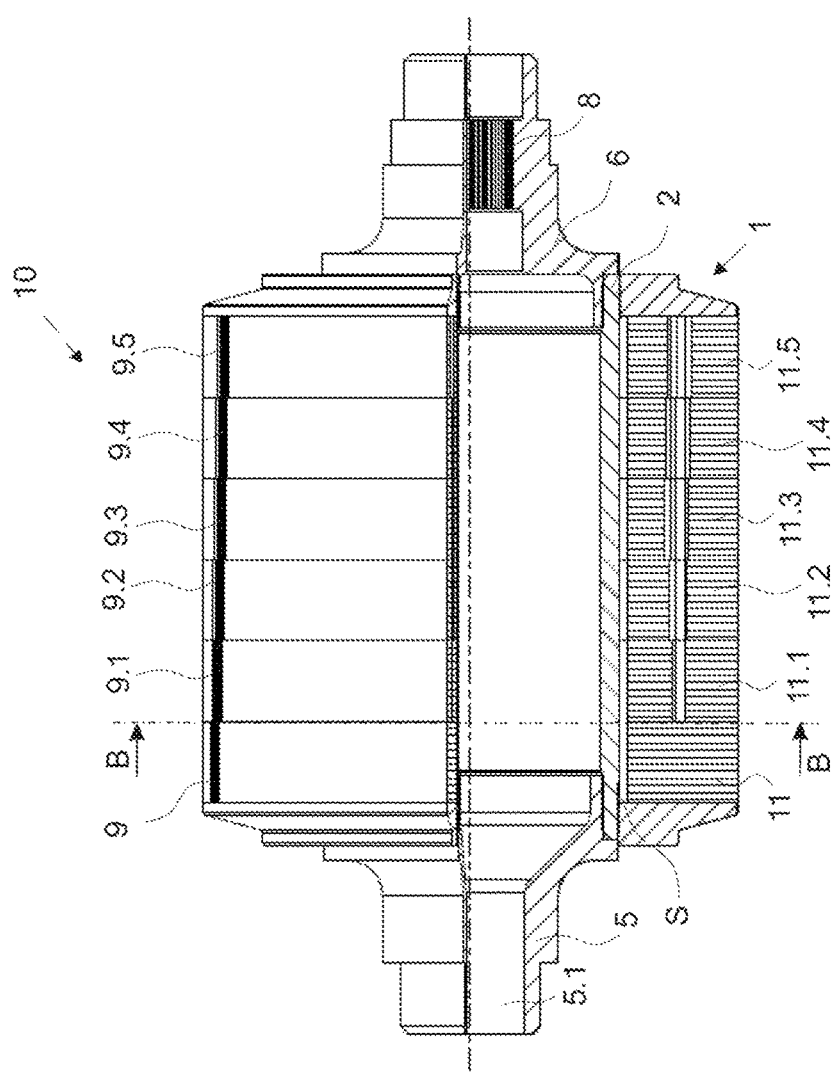

METHOD AND ASSEMBLY DEVICE FOR ASSEMBLING AN ELECTRIC MACHINE

CROSS REFERENCE TO RELATED APPLICATIONS

This application is a U.S. National Stage Entry of International Patent Application Serial Number PCT/EP2016/069504, filed Aug. 17, 2016, which claims priority to German Patent Application No. DE 10 2015 216 971.5, filed Sep. 4, 2015, the entire contents of both of which are incorporated herein by reference.

FIELD

The present disclosure generally relates methods and assembly devices for assembling electric machines.

BACKGROUND

The use of electric machines is fundamentally known, such as electric motors or electric generators. An electric machine is a machine used in electric energy engineering and constitutes a form of an energy transducer. There are many different types of electric machines, so that these are distinguished from one another in particular through their layout. In rotating electric machines, for example, it is possible to distinguish between commutator machines, synchronous machines, and induction machines. This classification pertains in particular to the mode of operation of the machine itself. It is also possible to make a classification of rotating electric machines in regard to their type of current, so that for example mention may be made of direct current machines, alternating current machines, or three-phase alternating current machines. Electric machines basically have a stator, that is, a stationary element, and a rotor, representing a rotating element. The stator usually consists of a massive iron core for the conducting of a magnetic flux. A magnetic field with alternating polarity is generated in this case, for example, by permanent magnets. The rotor usually consists of a laminated iron core, in the grooves of which are located coils of copper wire, for example. These coils are connected to corresponding hooks of the commutator.

When arranging the laminated core on the rotor shaft it must be ensured that this laminated core is secured such that no interference fit is required radially between the shaft outer diameter and the laminated core inner diameter in order to enable a gap to be formed between the shaft segment and the laminated core. Consequently, it is basically known how to enable an axial clamping of the laminated core between individual pressure disks for the fastening of the laminated core on the shaft segment, so that a frictional transmission of torque occurs for the torque generated in the laminated cores via the shaft segment to the take-off site, such as the gearing. Based on this desired radial play between the outer diameter of the shaft segment and the laminated core inner diameter, however, a freedom from contact occurs between these components, which has the drawback that the connection techniques known from the general prior art, such as a transverse interference fit or a form fit, which are the usual means of centering and angular orientation of the laminated core, cannot be used. For example, especially in the case of permanently excited synchronous machines, it is necessary for the angular position of individual laminated cores to the rotor shaft and also to one another to be adjustable in detail during the assembly. Especially in order to avoid cogging torques, in place of a long, axially continuous overall laminated core there are formed several axial partial segments (several laminated cores in a row). These laminated cores outfitted with permanent magnets are then mounted, as is known from the general prior art, with an angle offset of, for example, 1°-3° relative to each other in a row on the shaft segment. For this, it is necessary to make possible an orienting of the angular position by means of individual geometry elements, which must be present offset in each variant of the individual stack disks with regard to the actual electromagnetically designed lamination, such as the magnet pockets. It is considered to be a drawback that several laminated core geometries need to be observed and furthermore the magnetic flux influencing by means of the geometry elements is not the same in each of the variants. Consequently, the actual functioning of the optimal torque transmission is impaired, which results in nonuniform torques during operation, especially since the disks are not geometrically the same.

Thus, for example, DE 519 745 B presents a method of fastening a laminated core of rotors of electric machines. In this case, a bulge is swaged as an end stop at an appropriate distance for the particular purpose from the end of a tubular hollow body and then the metal sheets are placed in a row and the whole is placed in a pressing device. The hollow body with the metal sheets is then shoved onto a calibrated mandrel. Now, in a following pressing process, the metal sheets which are forcefully centered over their circumference by guide strips or a cylinder are first axially pressed together, after which the pressure is transmitted to the hollow body and this is swaged over the entire length of the laminated core so that it rests under high pressure against the individual metal sheets. However, with the method described here, a desired radial play between the shaft outer diameter and the laminated core inner diameter cannot be achieved.

DE 103 32 958 A1 describes a method for producing a firm connection between a hollow cylinder and a hollow cylindrical disk pack consisting of a plurality of profile disks placed axially against one another. In this process, an inner cylinder is shoved largely free of force into the hollow cylinder and after reaching a given axial entrance position a force locking between the inner cylinder and the hollow cylinder is produced by relative rotation of inner cylinder and hollow cylinder. For this, it is necessary for the inner contour of the hollow cylinder and the outer contour of the inner cylinder to be shaped coordinated to each other.

Thus a need exists to eliminate at least partly the drawbacks described above in methods and devices for assembling a rotor segment of an electric machine, as well as to create methods and assembly devices for the mounting of a rotor segment of an electric machine enabling in a simple and economical manner a centering as well as an angular orienting of laminated cores on the rotor shaft of the rotor segment.

BRIEF DESCRIPTION OF THE FIGURES

FIG. 5 is a side view of an example electric machine mounted according to the present disclosure.

FIG. 6 is a top view of the example electric machine shown in FIG. 5.

FIG. 9 is a side quarter-section view of an example electric machine with angle-offset laminated cores.

FIG. 10 is a top view, cross-sectional view of an example electric machine taken across line BB in FIG. 9.

DETAILED DESCRIPTION

Figure 1:
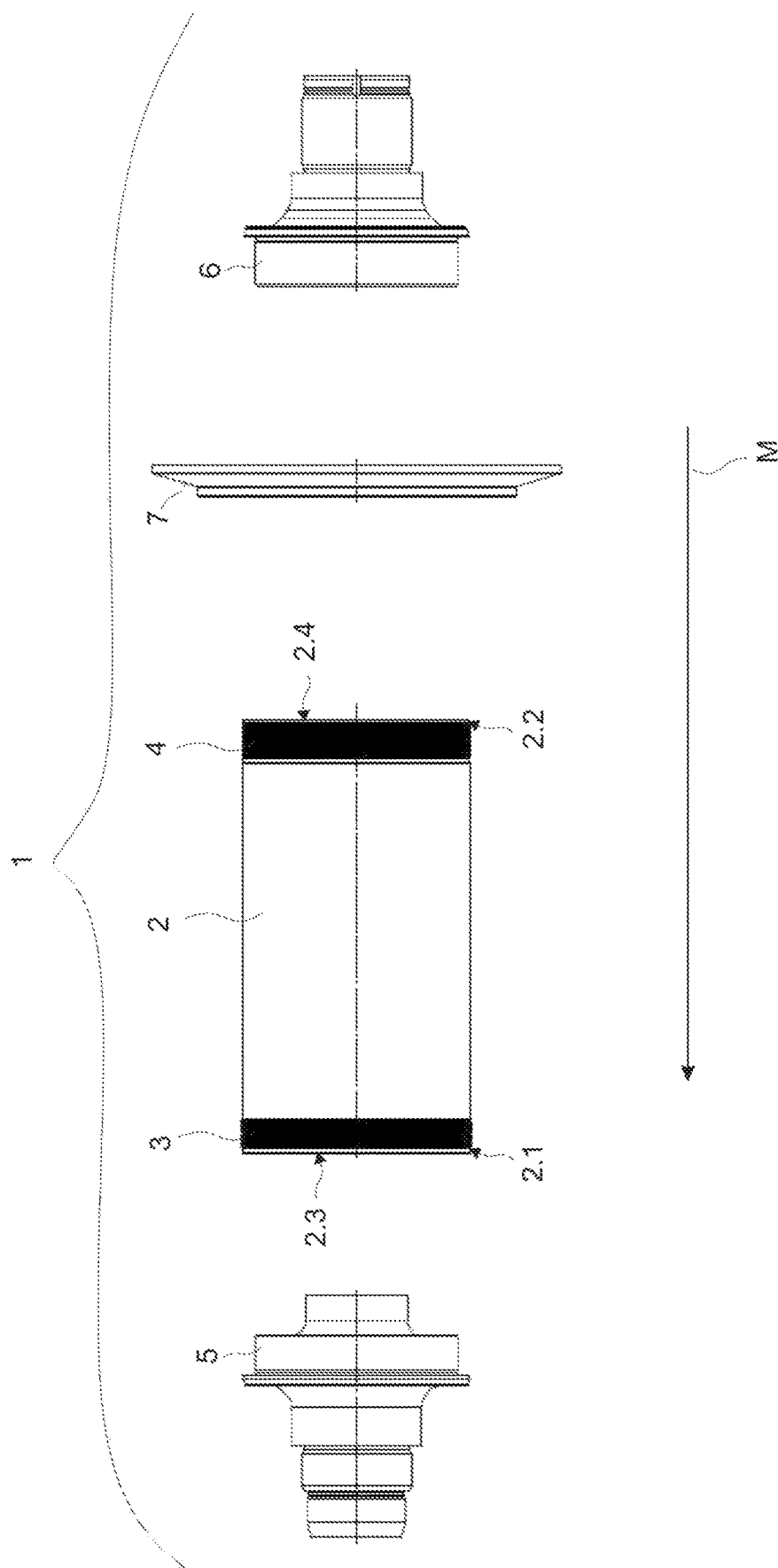
FIG. 1 is a side view of an example preassembly method for mounting a rotor shaft.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

As those having ordinary skill in the art will understand, features and details that are described in connection with the example methods of the present disclosure may also apply in the context of example assembly devices of the present disclosure as well as example rotor segments of the present disclosure, and vice versa, so that a mutual referencing is or can be done each time with regard to the description of the individual aspects of the present disclosure. Furthermore, the example methods of the present disclosure can be carried out with the example assembly devices of the present disclosure and the example rotor segments of the present disclosure can be created by using the example methods of the present disclosure or mounted with the example assembly devices of the present disclosure.

The method according to the invention for assembling a rotor segment of an electric machine, wherein the rotor segment has at least one rotor shaft, at least one laminated core joined to the rotor shaft, and two pressure elements, which clamp the at least one laminated core, has the following steps:

arranging the rotor shaft in an assembly device and orienting the rotor shaft using an orienting means of the assembly device;

arranging the at least one laminated core and at least the second pressure element, or the first pressure element within a clamping means of the assembly device, orienting at least the at least one laminated core by means of a positioning module of the clamping means, and moving the rotor shaft in relation to the clamping means in such a way that the at least one laminated core is pushed onto the rotor shaft and at least the second pressure element or the first pressure element is connected to the rotor shaft.

The rotor segment according to the invention is a component of an electric machine, being as previously mentioned an electric motor or also an electric generator, such as a direct current machine or an induction machine. Advantageously, at least one laminated core should be arranged on the rotor shaft of the rotor segment of the electric machine, advantageously at least two or more, especially six laminated cores. A laminated core advantageously consists of a plurality of coated electric metal sheets, which are pressed together or joined together for example with rivets, staples, or by one-sided welding to form the laminated core. The rotor shaft itself has at least one shaft segment, such as a solid shaft or a hollow shaft. Furthermore, it is possible for the rotor shaft to also have at least one flange element arranged on the shaft segment, advantageously also two flange elements arranged on the shaft segment. One flange element is arranged on a first distal end of the shaft segment, while the other (second) flange element is arranged on another (second) distal end of the shaft segment, being opposite the first distal end. It is furthermore conceivable for the rotor shaft to also have at least one pressure element or for the at least one pressure element, advantageously two pressure elements, to be arranged on the rotor shaft to create a rotor segment. It is advantageous for the at least one laminated core to be clamped between two pressure elements. The pressure elements used for the clamping of the at least one laminated core and advantageously a plurality of laminated cores are advantageously pressure disks, between which the at least one laminated core and advantageously a plurality of laminated cores is or are arranged. By means of the pressure elements, the laminated cores are pressed against each other or the at least one laminated core is positioned in a predefined position relative to the rotor shaft, especially to the shaft segment of the rotor shaft. The at least one laminated core is advantageously arranged coaxially to the shaft segment. Advantageously, the rotor shaft is designed so that it can be arranged in an assembly device and oriented by means of an orienting means, which is designed for example as an orienting mandrel or as an orienting point or an orienting chuck or an orienting gripper. Accordingly, it is conceivable for the orienting means to be a chuck from the Hainbuch company, also known as a Hainbuch chuck. The orienting means of the assembly device serves advantageously for orienting the rotor shaft with respect to the at least one laminated core, advantageously for orienting the rotor shaft substantially coaxially to the laminated core. The at least one laminated core is arranged in particular inside a clamping means of the assembly device. By means of the orienting means as well as the clamping means, there occurs consequently an orienting of the rotor shaft relative to the arranged laminated core and to at least one of the pressure elements arranged inside the clamping means.

The clamping means serves advantageously for positioning the at least one laminated core as well as one of the pressure elements, such as the first pressure element or the second pressure element or also both pressure elements in a defined position relative to the rotor shaft. A positioning module of the clamping means serves for the detailed orienting of the laminated core and/or the pressure element or pressure elements. The clamping means itself is advantageously a chuck. The positioning module has, for example, a gripping element or also a pushing element, especially movement elements, by means of which the laminated core can be positioned with respect to its angular orientation, among others. It is furthermore conceivable for the positioning module to have sensors, especially at least one sensor means or a plurality of sensor means, for measuring, especially detecting the position of the clamped laminated core or the plurality of clamped laminated cores. It is furthermore possible for the clamping means or the assembly device itself to have an evaluation unit, which compares the nominal values to the actual values in regard to the position of the laminated core within the clamping means and evaluates the results. It is furthermore conceivable for the clamping means, especially the assembly device itself, to also have a transmission unit, which puts out corresponding control commands to a control unit for the moving or actuating of the movement elements of the positioning module. The control unit or drive unit for actuating the movement elements of the positioning module accordingly serves advantageously for positioning the at least one laminated core, especially a plurality of laminated cores, within the clamping means so that the laminated cores have, for example, a defined angular position relative to each other.

After the arranging of the rotor shaft as well as the laminated core and at least one pressure element or also both pressure elements in the assembly device, the rotor shaft is moved relative to the clamping means and accordingly relative to the laminated core as well as the pressure element or the pressure elements. This means that the orienting means is moved relative to the clamping means such that the at least one laminated core is pushed onto the rotor shaft, especially the shaft segment of the rotor shaft. In addition to the laminated core, also at least one pressure element or also both pressure elements are arranged on the rotor shaft or pushed onto the rotor shaft when pressure disks are designed as the pressure elements. Advantageously, the rotor shaft, especially the shaft segment of the rotor shaft, has at least one region with a material raising, advantageously with two material raisings, such as a roller burnishing. The material raisings are advantageously formed at the respective distal ends of the shaft segment, especially of the circumferential wall of the shaft segment of the rotor shaft. Advantageously, the laminated core has a through opening or continuous borehole, through which the rotor shaft is led. When a pressure disk is used as the pressure element, and the pressure disk also has a substantially central through opening, the pressure disk is advantageously press-fitted onto a distal end, especially onto the material raising at the distal end of the rotor shaft. Consequently, when a pressure element, especially a pressure disk, is pushed onto the rotor shaft, an interference fit is produced between the rotor shaft, especially the shaft segment of the rotor shaft in the region of this material raising or roller burnishing, and the pressure element. This is favored in that the rotor shaft, especially the shaft segment in the region of the material raising, has a larger outer diameter than the pressure disk diameter of the central through opening of the pressure disk. Furthermore, it is also conceivable that the pressure element is fashioned as a clamp or pliers, and accordingly can be arranged on the rotor shaft in order to clamp at least one laminated core between itself and the other pressure element, especially the first pressure element. In this case, the shaft segment of the rotor shaft has no material raising. It is furthermore possible, insofar as two pressure elements, especially pressure disks, are arranged in the clamping means, for at least the first pressure disk to have a through diameter which is larger than the outer diameter of the second material raising at the second distal end of the shaft segment. Advantageously, the first material raising at a first distal end of the shaft segment serves for the arrangement of a first pressure element, especially a first pressure disk. The second material raising at a second distal end of the shaft segment serves advantageously for the arrangement of a second pressure element, especially a second pressure disk. Advantageously, the first material raising in this case is configured so that the shaft segment at least in the region of the first material raising has an outer diameter which is larger than the outer diameter in the region of the second material raising. Furthermore, it is conceivable that the second pressure disk has a through diameter which is smaller in dimension than the through diameter of the first pressure disk. For example, thanks to an arrangement of the pressure disks and the at least one laminated core inside the clamping means in which the at least one laminated core is arranged between the first pressure disk and the second pressure disk, and the first pressure disk is positioned such that when the rotor shaft is introduced into the clamping means the through opening of the first pressure disk is first traversed by the rotor shaft, guides the first pressure disk over the second material raising of the rotor shaft—due to the difference in diameters—up to the first material raising, at which an interference fit arises between the rotor shaft, especially the shaft segment of the rotor shaft, and the sheet metal disk.

In the context of the invention, it is furthermore conceivable that the rotor shaft is premounted. In this case, it is possible for a shaft segment of the rotor shaft to be connected to at least one of the pressure elements, especially the first pressure element, such that the first pressure element is arranged at a first distal end of the shaft segment. The shaft segment of the rotor shaft is advantageously a hollow shaft or also a solid shaft. The pressure element, especially the first pressure element, is advantageously a pressure disk, which is arranged on a region, especially a region at the first distal end of the shaft segment, which has a larger shaft segment outer diameter on account of a material raising than the diameter of the through borehole of the pressure element. Consequently, the material raising is formed in the region of the first distal end of the shaft segment on its circumferential wall. It is likewise conceivable for the pressure element to be arranged in the form of a clamp or an end stop on the shaft segment of the rotor shaft or even to be molded onto it. The second pressure element is advantageously a pressure disk which can be arranged inside the clamping means, which when the laminated core is joined on the rotor shaft is connected to the rotor shaft, especially a material raising on the shaft segment of the rotor shaft. However, it is also conceivable that the second pressure element is likewise configured as a clamp or an end stop, etc., and is arranged, after putting in place the at least one laminated core, such that a clamping of the laminated core between the pressure elements becomes possible. It is furthermore conceivable that the second pressure element, configured for example as a clamp or an end stop, etc., is likewise arranged in the clamping means and connected together with the at least one laminated core to the shaft segment of the rotor shaft. Also conceivable is an arrangement of a first pressure element formed as a pressure disk and a second pressure element designed as an end stop or clamp, etc.

It is furthermore possible that, during the premounting of the rotor shaft, the shaft segment is connected to a first flange element, which is arranged on a first end face of the shaft segment, or connected to a second flange element, which is arranged on a second end face of the shaft segment. Advantageously, the flange elements also serve for making a connection with in particular the orienting means or the holding means of the assembly device, in order to make possible an orienting or arranging of the shaft segment or the rotor shaft inside the assembly device.

In the context of the invention, it is furthermore possible that the rotor shaft is moved relative to the clamping means until the at least one laminated core makes contact with a pressure element premounted on the shaft segment of the rotor shaft, especially the first pressure element. Accordingly, the rotor shaft, especially the shaft segment, will be introduced so far into the chuck and move through the through opening of the laminated core until the first pressure element rests against a side wall of the laminated core facing the pressure element. It would also be conceivable for the rotor shaft to be moved relative to the clamping means until the component arrangement situated in the clamping means, consisting of the first pressure element, the second pressure element and the at least one laminated core arranged between the two pressure elements, is placed or shoved in a predetermined position on the shaft segment of the rotor shaft. Accordingly, the rotor shaft, especially the shaft segment, is introduced so far into the chuck and moved at least through the through opening of the laminated core and advantageously also through the through openings of the pressure elements designed as pressure disks until at least the first pressure element is arranged at a first distal end of the shaft segment, advantageously also until the second pressure element is arranged at a second distal end of the shaft segment.

Advantageously, it is possible for the orienting means to be arranged on a first flange element of the rotor shaft such that at least one chuck segment of the orienting means encloses at least partly a section of the first flange element or a receiving segment of the orienting means engages at least partly encloses with a recess of the first flange element. Consequently, advantageously, the chuck segment and the receiving segment serve for the positioning and orienting of the rotor shaft relative to the clamping means of the assembly device and consequently to the laminated core arranged in the clamping means of the assembly device and the pressure element. The receiving segment of the orienting means is advantageously designed as a mandrel or a pin, in order to engage at least partly in a recess of the flange element.

It is furthermore conceivable that a receiving means for the receiving and guiding of the rotor shaft is arranged on the second flange element of the rotor shaft, the receiving means being designed to be movable such that it can move between the clamping means and the rotor shaft. Consequently, the receiving means, advantageously a pushing element, such as an extensible push rod of the receiving means, advantageously moves through the clamping means of the assembly device, so that the receiving means can make contact with and receive the rotor shaft at the second flange element of the rotor shaft. Advantageously, the orienting means and the receiving means of the assembly device is designed to be movable, and the rotor shaft itself is advantageously clamped between the orienting means and the receiving means. The rotor shaft is movable by means of the receiving means and orienting means of the assembly device, for example relative to the clamping element and the laminated core arranged in the clamping element, such that the receiving means is advantageously introduced by means of a corresponding extensible element, such as the push element, while the orienting means is extended by means of a corresponding extensible element, in order to make possible a joining or placement of the laminated core on the rotor shaft, especially the shaft segment of the rotor shaft. Or vice versa, so that it is furthermore possible for the receiving means to be moved together with the rotor shaft along the clamping means.

In the context of the invention, it is conceivable for a sensor means of the clamping means to detect the angular position of at least one marking of the at least one laminated core. Consequently, the laminated core advantageously has at least one marking, which is configured for example as a recess, such as a groove or an indentation, or as a projection or color marking, which consequently can be detected with a sensor means, such as an optical sensor or a touch sensor. The angular position is ascertained by the sensor means and this information or data is relayed advantageously to an evaluation unit of the assembly device. The evaluation unit of the assembly device evaluates the detected actual values with regard to the angular position of the laminated core by a comparison with nominal values regarding the position. If the actual angular position deviates from the nominal angular position of the laminated core, a control unit is triggered. The control unit is advantageously a component of the assembly device. The control unit places the movement elements of the positioning module in motion, such that the laminated core is reoriented for example in terms of its angular position.

In the context of the invention, it is furthermore possible for a plurality of laminated cores which can be offset relative to each other in regard to their angular position to be arranged on the rotor shaft, while the adjusting of the angular position is done by means of an orienting tool, which positions the laminated cores relative to each other in consideration of markings arranged on each of the laminated cores. It is conceivable in this case that the orienting tool is designed as a template, which is moved substantially along an orienting edge in the axial direction at least partly along the shaft segment and engages at least partly with markings of the laminated core designed as a recess or is moved along this recess on the inside. The orienting tool advantageously rotates each individual laminated core in accordance with a given angular position. Advantageously, the orienting tool is a component of the clamping means and enables an angle offsetting of the individual laminated cores during their coaxial orienting to the rotor shaft being arranged. By means of the orienting tool, a simple and reliable adjusting of the angle offset of the individual laminated cores of the rotor segment relative to each other can be achieved.

In the context of the invention, advantageously the markings are positioned with an angle offset relative to each other such that the angle offset of the laminated cores is adjusted and represented in this way.

There is furthermore claimed an assembly device for the assembling of a rotor segment of an electric machine, wherein the rotor segment has at least one rotor shaft, at least one laminated core joined to the rotor shaft, and two pressure elements, which clamp the at least one laminated core. The assembly device according to the invention has at least one orienting means for orienting the rotor shaft in a defined assembly position and a clamping means for positioning the at least one laminated core as well as at least one of the pressure elements relative to the rotor shaft. The clamping means according to the invention comprises at least one positioning module at least for orienting the at least one laminated core relative to the rotor shaft. Advantageously, the clamping means makes possible a coaxial orientation of the rotor shaft, especially the shaft segment of the rotor shaft, to the at least one laminated core.

Advantageously, the clamping element is a chuck for receiving and arranging the at least one laminated core as well as one of the pressure elements, especially the second pressure element. It is also conceivable for the clamping element to be designed as a clamping chuck, and it serves to receive the pressure element, especially the second pressure element, which is designed for example in the form of a pressure disk.

It is furthermore conceivable that the orienting means comprises at least one chuck segment for partly enclosing and receiving a section of the rotor shaft or a receiving segment for partly engaging with and receiving a section of the rotor shaft. Advantageously, the receiving segment is spring-loaded, in particular, it is mounted by means of a compression spring. In this way, a defined pressing force is applied to the rotor shaft in order to assure a reliable clamping of the rotor shaft between the receiving means and the orienting means in the assembly device. It is also advantageously possible in this way to clamp rotor shafts of different size and dimension in the very same assembly device and move them relative to the clamping means.

The described assembly device produces all of the advantages already described for the method of assembling an electric machine according to the first aspect of the invention.

The rotor segment according to the invention has a shaft segment as well as at least two laminated cores, which can be arranged at an offset to each other in relation to angular position, wherein each of the laminated cores has at least one marking. This marking is advantageously a concave or convex structure, such as a material recess, like an indentation, a fluting or groove, or a V-shaped stamped notch, or a material raising, such as a material bulging, or a simple flattening or a color marking. Each of the laminated cores has at least one metal sheet, advantageously at least two or more interconnected metal sheets. When at least two or a plurality of metal sheets are present per each laminated core, it is possible for at least one of the metal sheets of the laminated core to have a marking. It is furthermore possible for the rotor segment to have more than two laminated cores, where each time the laminated cores may be arranged with an angular position offset from each other on the shaft segment.

It is furthermore conceivable that the rotor segment has two pressure elements, which clamp the at least two laminated cores between each other. In this case, it is possible for at least one of the pressure elements to be, for example, a pressure disk or a clamp or a collet or a comparable element by means of which a pressing together of the at least two laminated cores is made possible.

It is furthermore conceivable that the laminated cores consist of a plurality of metal sheets arranged next to each other, each metal sheet having a marking. Advantageously, the marking serves to make possible a centering and an angular position orienting regardless of the internal geometry of the individual metal sheets or the individual laminated cores.

It is conceivable that the individual metal sheets of each laminated core are arranged or oriented with respect to each other such that their markings are flush or arranged flush with each other. This means that, in the case of a stack of individual metal sheets, the resulting sheet stack or laminated cores then have this marking in axially parallel and continuous manner on their entire axial height or the width of the laminated core. Advantageously, each sheet of a laminated core has a marking at its outer diameter, the marking being for example an indentation, which starts at the edge of the sheet and extends at least for a portion radially inward. In the case of a flush arrangement of the markings of the individual sheets, it is advantageously conceivable to use a tool, especially a template, for orienting the individual laminated cores relative to each other.

It is furthermore conceivable that the markings are present as a multiple of the offset angle. Accordingly, each metal sheet advantageously has a 6-fold marking, insofar as six disks or six laminated cores are to be arranged with angular position offset relative to each other. This means that advantageously the number of markings per laminated core or per metal sheet corresponds to the number of sheets or laminated cores that can have an angular position offset from each other for each rotor segment. This advantageously makes it possible for the punching geometry of the individual metal sheets to be geometrically the same. It is not necessary to keep on hand different design shapes. This makes possible an economical production of metal sheets or laminated cores with an angular position offset. The desired offset in the angular position is advantageously realized only at the time of the mounting of the metal sheets or the laminated cores on the shaft segment, by setting off the markings provided for this from each other by a locking sleeve each time. Furthermore, this enables a good visual or optical measurement possibility of controlling the correct angular position.

Alternatively it is conceivable that the markings or geometrical features per each orienting position are formed only once per metal sheet or metal sheet disk. In this case, it is conceivable that the desired angular position offset is made possible by the aforementioned template, which is outfitted for example with angle-offset seats for the respective disks or laminated cores.

In the context of the invention, it is furthermore conceivable that the marking has a plurality of features, wherein the number of features per marking corresponds to the number of laminated cores being joined on the shaft segment and being able to be offset in angular position relative to each other. The number of features per marking advantageously corresponds accordingly to the number of laminated cores or metal sheets having an angular position offset from each other, such that for example in the case of six metal sheets being set off from one another in their angular position each of the six sheets has a marking with six pronounced features. Accordingly, in the case of a number of six laminated cores being set off from each other in angular position, for example, each of the laminated cores has at least one marking with six features. This makes possible a simple and reliable procedure for setting off the angular position. Consequently, it is conceivable that the markings are arranged with an offset angular position relative to each other such that this reflects the angle offset of the laminated cores.

The described rotor segment yields all of the benefits already described for the method of assembling an electric machine according to the first aspect of the invention or the assembly device according to the second aspect of the invention.

FIG. 1 shows, in a side view, a rotor shaft 1, especially a method of preassembly of the rotor shaft 1. The rotor shaft 1 has a shaft segment 2, having at a first distal end 2.1 a first material raising 3 or roller burnishing 3 and at a second distal end 2.2 a second material raising 4 or roller burnishing 4. The shaft segment 2 itself is advantageously formed as a solid shaft or also as a hollow shaft. During the preassembly to produce the rotor shaft 1, the shaft segment 2 is connected to a first flange element 5, which is arranged at the first end face 2.3 of the shaft segment 2. After the arranging of the first flange element 5 on the shaft segment 2, advantageously a first pressure element 7, formed for example as a pressure disk, is shoved onto the shaft segment 2 in the assembly direction M. Advantageously, the first pressure element 7 is shoved so far onto the shaft segment 2 until it contacts the first flange element 5 or comes up against the first roller burnishing 3. Thanks to the first roller burnishing 3, the shaft segment 2 has an outer diameter in the region of the first distal end 2.1 of larger dimension than a diameter of the through borehole of the first pressure element 7, not shown here. Advantageously, it is conceivable that the second roller burnishing 4 has not yet been formed when placing the first pressure element 7 on the shaft segment 2. Thus, it is possible for this second roller burnishing 4 to be formed or generated only after arranging the first pressure element 7 on the shaft segment 2, so as to avoid advantageously an unwanted connection of the first pressure element 7 to the shaft segment 2 in the area of the second roller burnishing 4. However, it is also conceivable for the second roller burnishing 4 to be formed on the shaft segment 2, corresponding to the first roller burnishing 3, prior to the mounting of the first pressure element 7 on the shaft segment 2. For this, it is necessary for the shaft segment 2 to have in the region of the second roller burnishing 4 or the second material raising 4 a smaller outer diameter, due to the roller burnishing 4 in this area, than in the area of the first roller burnishing 3 or the first material raising 3, in particular. Hence, advantageously, the second roller burnishing 4 is of smaller dimension in its outer diameter than the inner diameter of the through borehole of the first pressure element 7. Consequently, it is possible to push the pressure element 7—without forming a connection with the second roller burnishing 4—over this second roller burnishing 4. After putting in place the first pressure element 7, the second flange element 6 is mounted on the second end face 2.4 of the shaft segment 2 in the assembly direction M.

Figure 2:
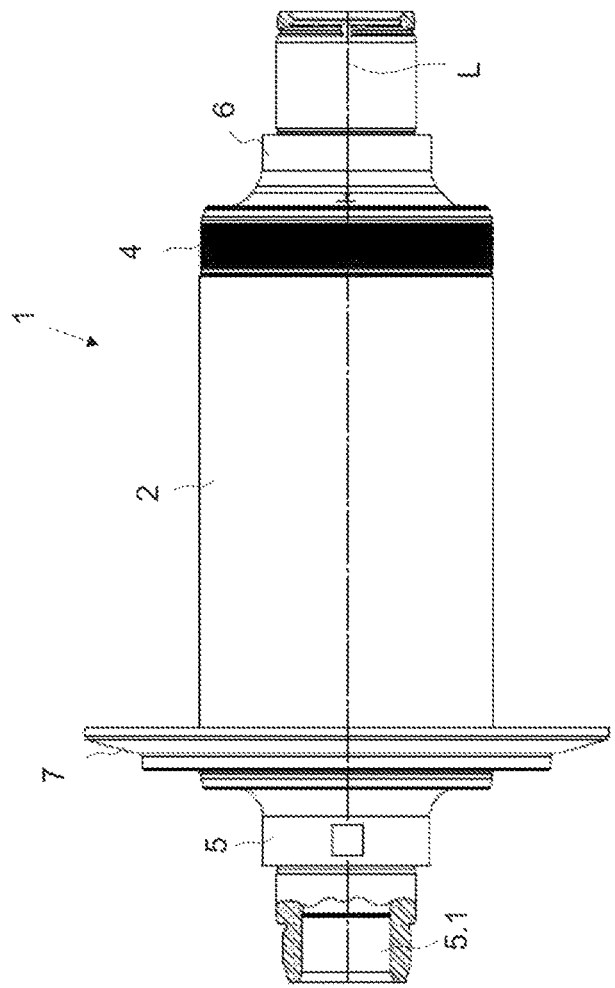
FIG. 2 is a side view of an example premounted rotor shaft.

An embodiment of a premounted rotor shaft 1 is shown in FIG. 2. Furthermore, it is evident from FIG. 2 that the first flange element 5, advantageously also the second flange element 6, may have in particular a recess 5.1. Advantageously, the recess 5.1 serves for interacting with a corresponding orienting means of an assembly device, as shall be further explained in detail below. Advantageously, the recess 5.1 of the first flange element 5 shown in FIG. 2 has an internal toothing (see FIG. 3), which advantageously serves for engaging with a corresponding external toothing of an orienting means of the assembly device. The reference L designates the longitudinal axis of the rotor shaft 1.

Figure 3:
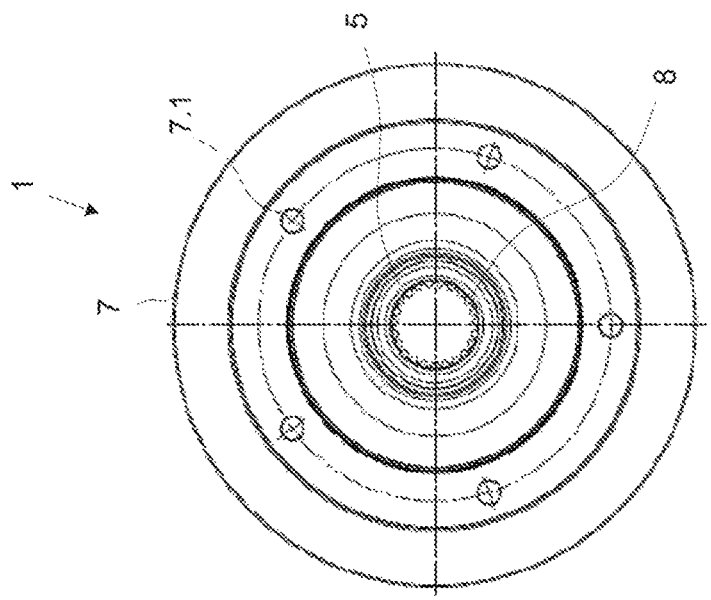
FIG. 3 is a front, top view the example premounted rotor shaft shown in FIG. 2.

FIG. 3 shows a front top view of the embodiment of a premounted rotor shaft 1 shown in FIG. 2. Furthermore, there are shown here boreholes 7.1 of the pressure element 7. These boreholes 7.1 serve, for example, to make possible cooling ducts extending through the laminated core, not shown here. Furthermore, the internal toothing 8 of the first flange element 5 is shown, which is formed inside the recess 5.1 of the first flange element 5.

Figure 4:
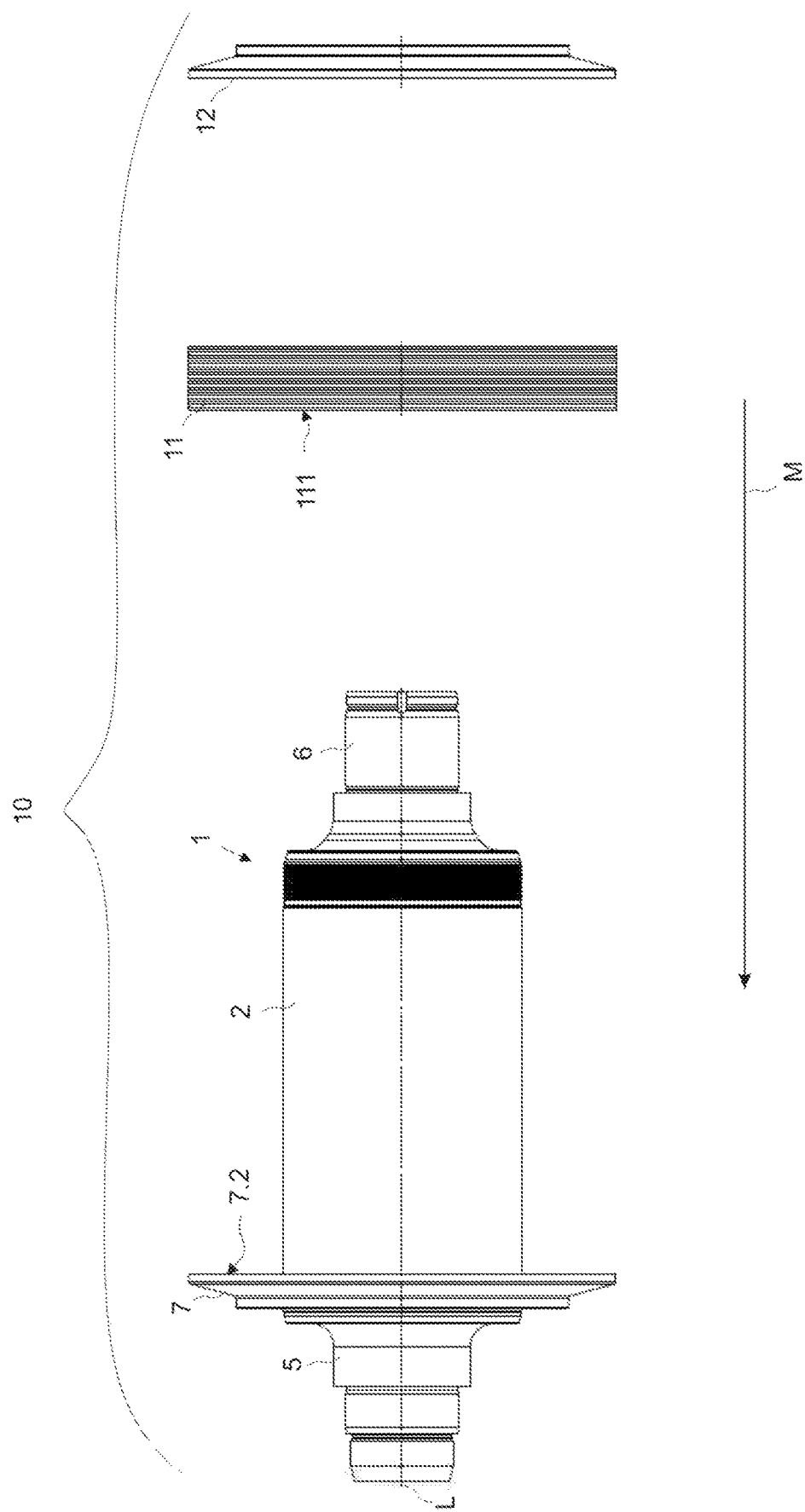
FIG. 4 is a side view of an example assembly method for an electric machine.

FIG. 4 shows the embodiment of a rotor shaft 1 as shown in FIG. 3 during the method of final assembly to form a rotor segment 10. At least one laminated core 11 and the second pressure element 12 are arranged on the rotor shaft 1 in order to form a rotor segment 10 in the context of the invention. In order to configure an electric machine 100, as shown schematically in the following FIG. 15, it is conceivable that a stator element or a stator 50 will also be arranged in addition to the rotor shaft 1 with arranged laminated core 11 and second arranged pressure element 12 (see, for example, FIG. 15). Advantageously, the rotor segment 10 of the invention extends at least for a portion within the stator element, not shown here.

In one embodiment of the method of the invention for the mounting of a rotor segment 10 of an electric machine, such as is shown in particular in FIG. 4, the at least one laminated core 11 for example is moved in the assembly direction M such that it makes contact by its side surface 111 with a side surface 7.2 of the first pressure element 7. Advantageously, a plurality of laminated cores 11 are shoved in the assembly direction M onto the rotor shaft 1, especially onto the shaft segment 2 of the rotor shaft 1. A second pressure element 12 serves to secure the at least one laminated core 11 on the shaft segment 2 of the rotor shaft 1 in a defined angular orientation or angular position. This second pressure element 12, as shown in FIG. 4, is likewise placed in the assembly direction M on the rotor shaft 1, especially the shaft segment 2 of the rotor shaft 1. By means of a press fit between the second pressure element 12 and the second roller burnishing 4 of the shaft segment 2, the pressure element 2 is advantageously joined to the shaft segment 2 of the rotor shaft 1, firm against displacement in the axial direction and firm against rotation in the circumferential direction.

FIG. 5 shows, in a side view, one embodiment of a rotor segment 10 of an electric machine. The rotor segment 10 comprises a rotor shaft 1 with a plurality of laminated cores 11 to 11.5, especially six laminated cores 11 to 11.5, arranged on the shaft segment of the rotor shaft 1, not shown here. Advantageously, the laminated cores 11 to 11.5 are clamped between the first pressure element 1 and the second pressure element 12. As shown in FIG. 5, the second flange element 6 also advantageously has a recess 6.1. This recess 6.1 advantageously has an internal toothing, which is not shown here.

FIG. 6 shows a front top view of the embodiment of the rotor segment 10 of an electric machine as shown in FIG. 5. Once again, the formation of the internal toothing 8 of the first flange element 5 is illustrated, as is the formation of a plurality of boreholes 7.1 formed in the circumferential direction of the first pressure element 7.

Figure 7:
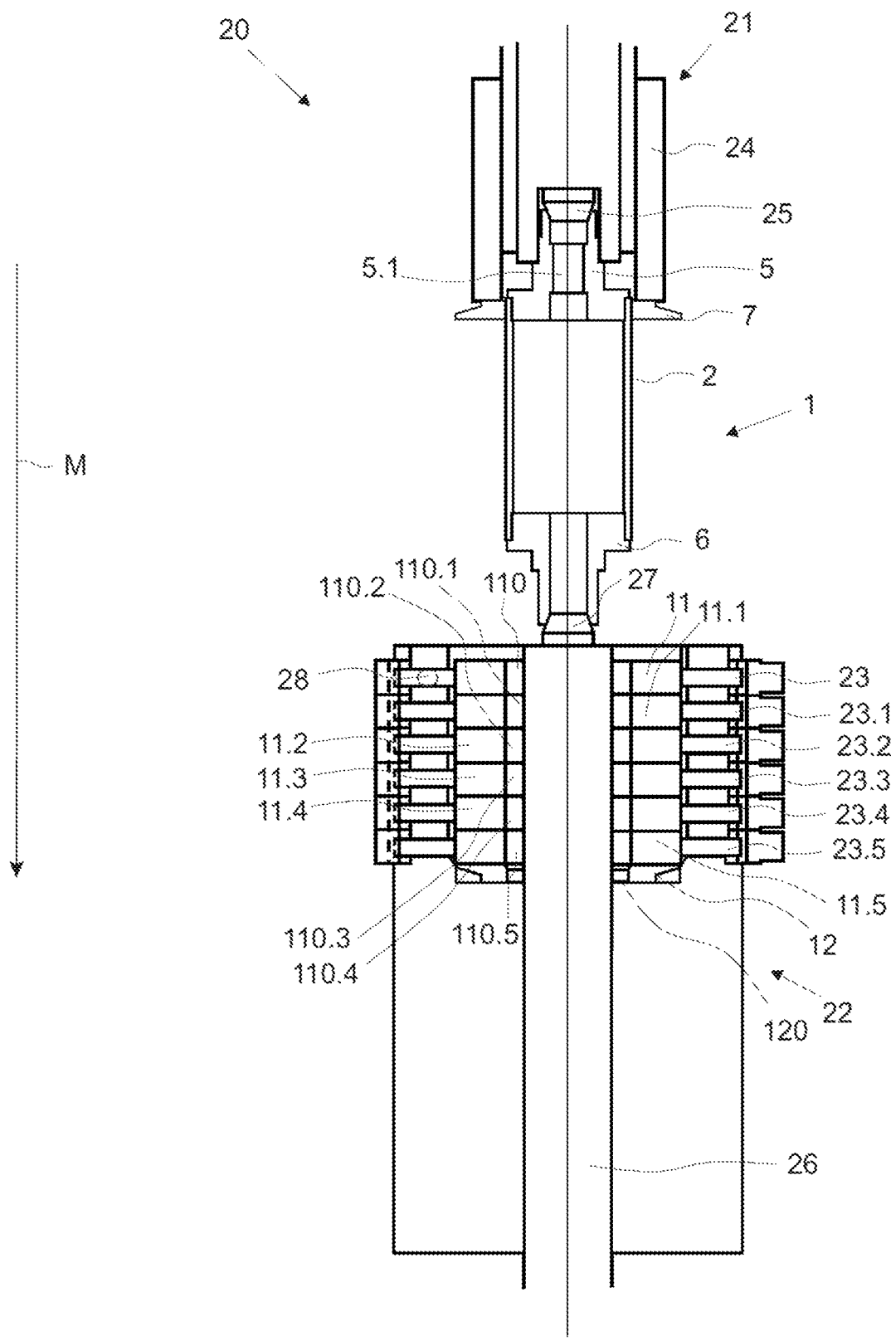
FIG. 7 is a side cross-sectional view of an example assembly device according to the present disclosure.

FIG. 7 shows in a side cross sectional representation one embodiment of an assembly device 20 according to the invention. For reasons of clarity, the assembly device 20 is not represented with the familiar sections. The assembly device 20 has an orienting means 21, which advantageously comprises a chuck segment 24 as well as a receiving segment 25. The orienting means 21 is advantageously arranged on the first flange element 5 of the rotor shaft 1, the chuck segment 24 enclosing at least one section of the flange element 5, while the receiving segment 25, being designed for example as a receiving mandrel or receiving pin, engages for at least a portion with the recess 5.1 (see FIG. 2) of the first flange element 5. It is conceivable that the receiving segment 25 has an external toothing, not shown here, which interacts with an internal toothing of the first flange element 5. Thus, it is conceivable that the receiving segment 25 is screwed into the recess 5.1 of the first flange element 5. Advantageously, the receiving segment 25 of the orienting means 21 is mounted by means of a spring element, not shown here, especially a compression spring element. This advantageously makes possible a simple arranging of the orienting means 21 on the rotor shaft 1.

Furthermore, FIG. 7 shows the clamping means 22 of the assembly device 20. The clamping means 22 has at least one positioning module 23, advantageously a plurality of positioning modules 23 to 23.5. Advantageously, the number of positioning modules corresponds to the number of laminated cores being placed on the shaft segment 2 of the rotor shaft 1. Accordingly, in the clamping means 22 there are likewise arranged six laminated cores 11 to 11.5, which are oriented by means of the corresponding positioning modules 23 to 23.5 in terms of their position relative to the rotor shaft 1, especially in terms of their angular position relative to each other. Furthermore, the second pressure element 12 is arranged in the clamping means 22 and consequently closes off the laminated cores 11-11.5 arranged in a row with respect to each other. Advantageously, the clamping means 22, especially each positioning module 23 to 23.5, has a sensor element, not shown here, in order to determine the position of the individual laminated cores 11 to 11.5. It is furthermore conceivable that the clamping means 22, especially each positioning module 23 to 23.5 of the clamping means 22, has an orienting tool, not shown here, by means of which in particular the angular position of the individual laminated cores 11 to 11.5 or individual metal sheets of a single laminated core 11 can be adjusted. Furthermore, a receiving means 26 is shown, which advantageously extends through the clamping means 22. Advantageously, the receiving means 26 and the clamping means 22 have the same center axis and consequently are arranged coaxially to each other. Advantageously, the receiving means 26 extends through the through boreholes 110 to 110.5 of the laminated cores 11 to 11.5 and through the through borehole 120 of the second pressure element 12, which advantageously is formed the pressure disk, and contacts the rotor shaft 1 at its second flange element 6. Advantageously, the receiving means 26 comprises a receiving journal 27, which also extends for at least a portion into a recess 6.1 (see FIG. 5) of the second flange element 6. By means of the receiving means 26 and the orienting means 21, the rotor shaft 1 is clamped in a defined position and oriented with respect to the clamping means 22 and the laminated cores 11 to 11.5 arranged therein as well as the second pressure element 12 arranged therein.

When joining together the laminated cores 11 to 11.5 with the rotor shaft 1, especially the shaft segment 2 of the rotor shaft 1, the orienting means 21 is moved for example in the assembly direction M, or the clamping means 22 against the assembly direction M. It is also conceivable for the orienting means 21 and the clamping means 22 to be moved toward each other, so that both means perform a movement at least temporarily. The mounting movement of the orienting means 21 and/or the clamping means 22 results in the rotor shaft 1, especially the shaft segment 2, being moved through the through boreholes 110 to 110.5 of the laminated cores 11 to 11.5 and through the through borehole 120 of the second pressure element 12. This movement occurs until a press fit is produced between the second pressure element 12 and the shaft segment 2, especially a roller burnishing applied to the shaft segment 2 (not shown here), especially the second roller burnishing 4 (see FIG. 1).

Figure 8:
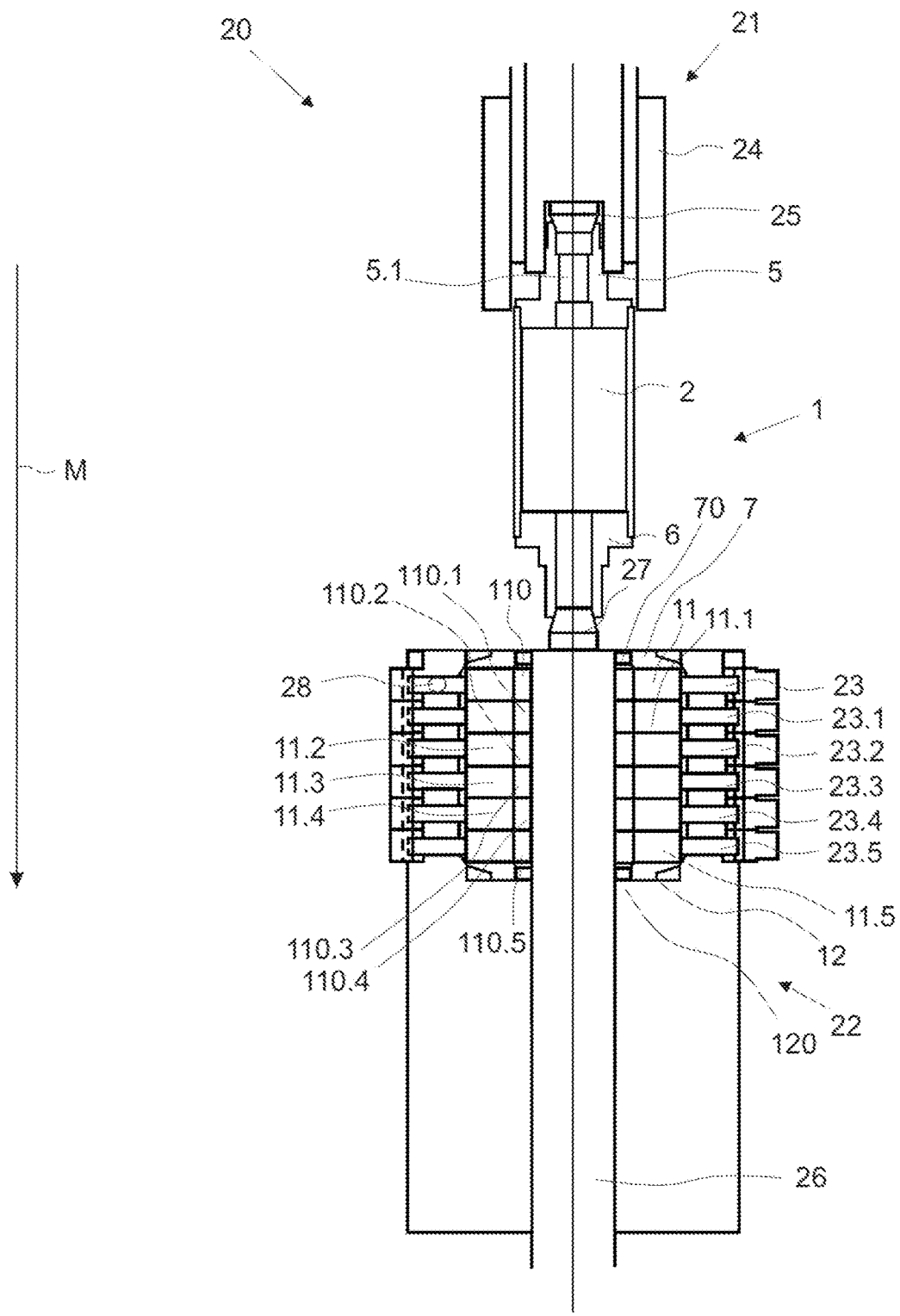
FIG. 8 is a side cross-sectional view of another example assembly device according to the present disclosure.

FIG. 8 shows in a side cross sectional representation another embodiment of an assembly device 20 according to the invention. For reasons of clarity, the assembly device 20 is not shown with the familiar sections. The assembly device 20 differs from the assembly device 20 shown in FIG. 7 essentially only in that the first pressure element 7 can also be arranged in the clamping means 22. Consequently, advantageously the first pressure element 7, the second pressure element 12 and at least one laminated core 23 and advantageously a plurality of laminated cores 23 to 23.5 are arranged in the clamping means 22, the laminated cores 23 to 23.5 being arranged between the first pressure element 7 and the second pressure element 12. All other features of the assembly device 20 correspond essentially to the embodiment shown in FIG. 7 for an assembly device 20, so that the explanations provided for that will or may be considered accordingly.

When joining together the laminated cores 11 to 11.5 with the rotor shaft 1, especially the shaft segment 2 of the rotor shaft 1, as already described for the assembly device 20 according to FIG. 7, the orienting means 21 is moved for example in the assembly direction M, or the clamping means 22 against the assembly direction M. It is also conceivable for the orienting means 21 and the clamping means 22 to be moved toward each other, so that both means perform a movement at least temporarily. The mounting movement of the orienting means 21 and/or the clamping means 22 results in the rotor shaft 1, especially the shaft segment 2, being moved at first through the through borehole 70 of the first pressure element, advantageously designed as a pressure disk, and then through the through boreholes 110 to 110.5 of the laminated cores 11 to 11.5 and lastly through the through borehole 120 of the second pressure element 12, which is likewise advantageously designed as a pressure disk. This movement occurs until a press fit is produced between at least the first pressure element 7 and the shaft segment 2, especially a roller burnishing applied to the shaft segment 2 (not shown here), especially the first roller burnishing 3 (see FIG. 1), or the second pressure element 12 and the shaft segment 2, especially a roller burnishing applied to the shaft segment 2 (not shown here), especially the second roller burnishing 4 (see FIG. 1).

FIG. 9 shows an embodiment of a rotor segment 10 of an electric machine in which the laminated cores 11 to 11.5 are arranged offset with respect to each other in terms of their angular position. This offset arrangement is seen especially by the positioning of the individual magnet pockets 9 to 9.5 with respect to each other. The magnet pockets 9 to 9.5 serve advantageously for the arrangement of permanent magnets in the laminated core. Furthermore, the formation of the desired gap S is shown in FIG. 9, which is formed between the laminated cores 11 to 11.5, especially the surface of the through borehole of the individual laminated cores 11 to 11.5, and the outer diameter of the shaft segment 2 of the rotor shaft 1.

Figure 11:
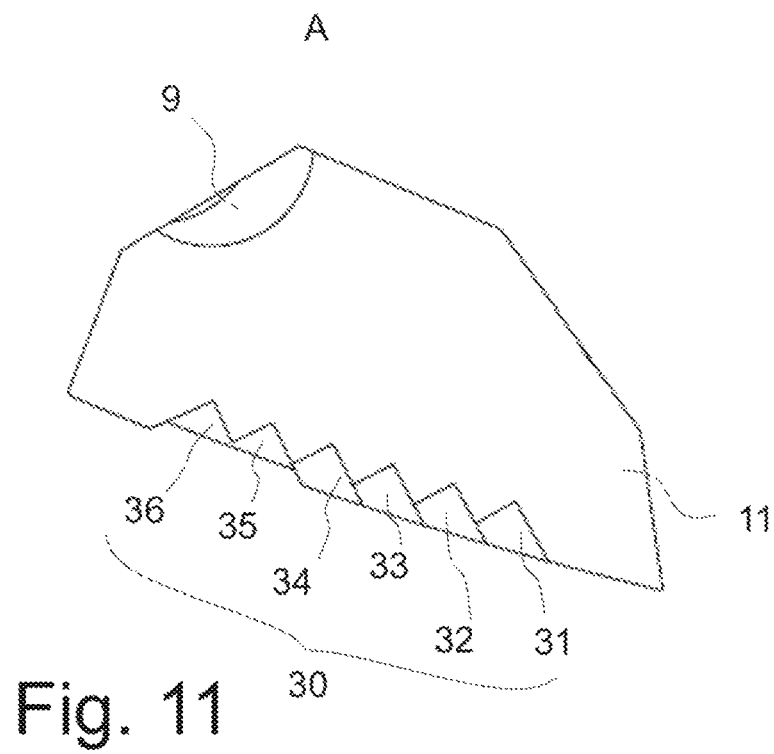
FIG. 11 is a detail view of example feature A of FIG. 10.

FIG. 10 shows a top view of the section B-B, as shown in FIG. 9. Furthermore, the configuration of the magnet pockets 9 to 9.5 with angular position offset from each other is represented. The feature A shown in FIG. 10 is shown enlarged in FIG. 11. This shows in particular the configuration of a marking 30 of an individual laminated core 11 to 11.5 (see FIG. 8) or an individual metal sheet of a laminated core. The marking 30 advantageously has a plurality of features 31 to 36, which are formed for example as recesses, indentations or notches. The number of features 31 to 36 per marking 30 corresponds advantageously to the number of mutually angular position-offset laminated cores 11 or metal sheets. This means that, for example when there are six metal sheets to be set off from one another in their angular position, each of the six sheets has a marking 30 with six pronounced features 31 to 35. Accordingly, with for example six laminated cores 11 being set off from one another in angular position, each of the laminated cores 11 has at least one marking 30 with six features 31 to 36. The angle offset of the markings 30 from each other advantageously reflects the angle offset of the laminated cores 11 from each other.

Figure 12:
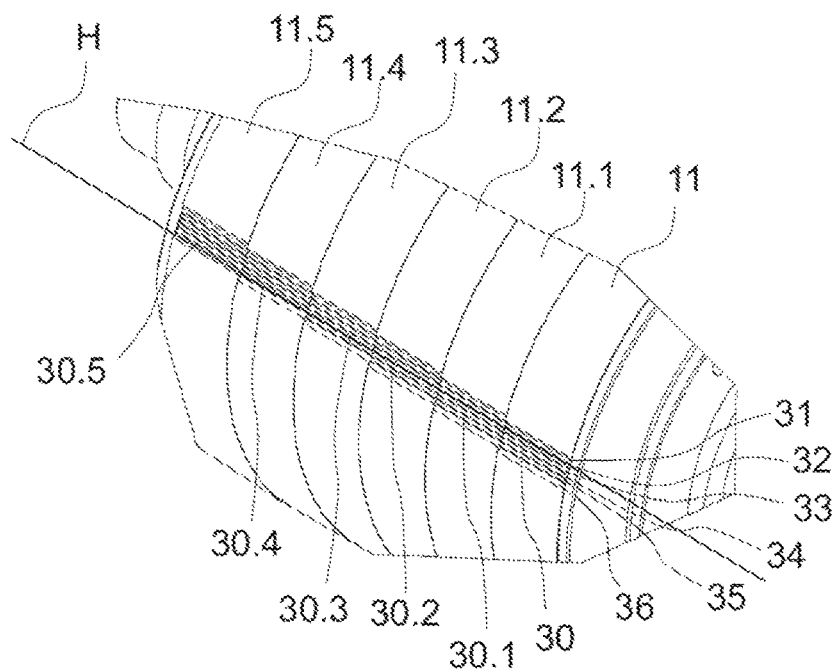
FIG. 12 is an isometric view of example laminated cores of an example electric machine, which are positioned with respect to angular position relative to one other.
Figure 14:
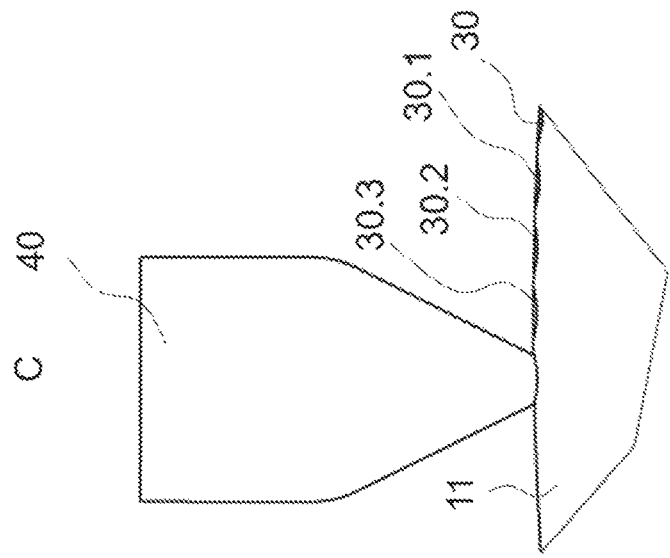
FIG. 14 is a detail view of the example tool shown in FIG. 13 for the arbitrary orienting and checking of the angle orientation of the individual laminated cores.
Figure 13:
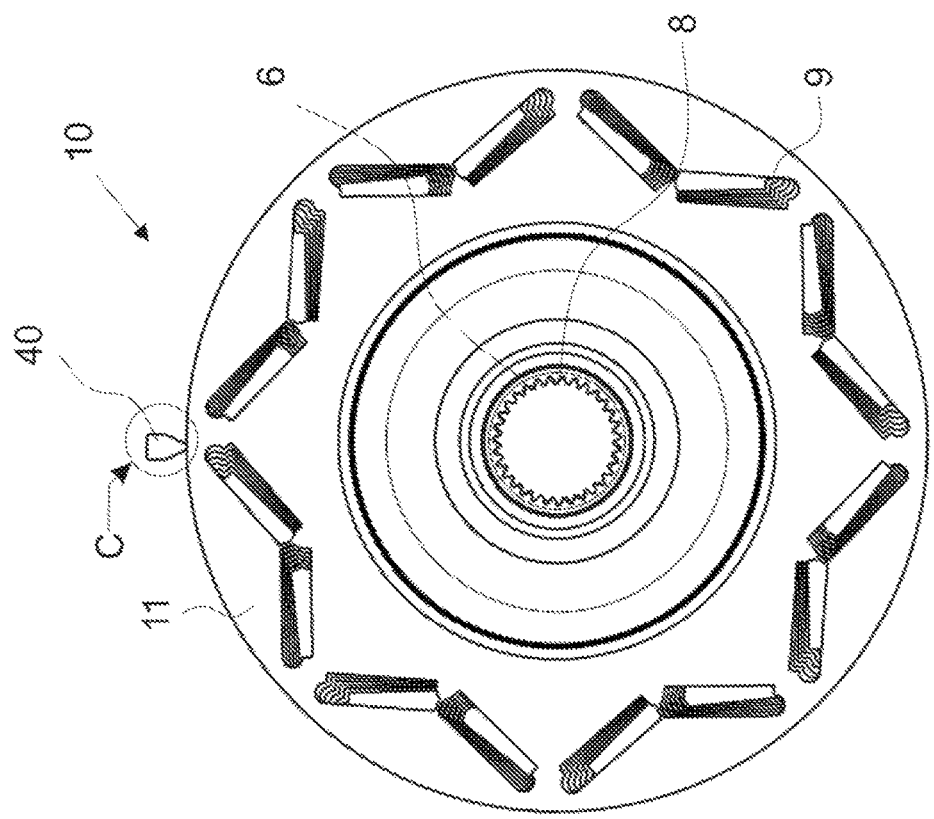
FIG. 13 is a top view taken with respect to FIG. 10 of an example electric machine with a tool for orienting as well as checking an angle orientation of individual laminated cores.

The positioning modules 23 to 23.5, as shown for example in FIG. 7 or in FIG. 8, determine advantageously by means of corresponding sensor units or sensor means 28, for example, the position of the laminated cores 11 to 11.5 or the individual metal sheets of a single laminated core 11 not only relative to the shaft segment and to the rotor shaft, but also to each other with the aid of the markings 30 to 30.5. As shown below for example in FIG. 13 and in FIG. 14, with the aid of an orienting tool 40, such as a template, the positioning of the individual laminated cores 11 to 11.5 or the individual metal sheets of a single laminated core 11 is done in regard to their angular position with respect to each other. As an illustration, FIG. 12 shows an isometric view of the laminated cores 11 to 11.5 positioned at an offset from each other in regard to their angular position. Consequently, each laminated core 11 to 11.5 has a marking 30 to 30.5, formed for example as flutes, grooves, or indentations, as shown in FIG. 12. Advantageously, each marking 30 to 30.5 has a plurality of features 31 to 36, formed as flutes, formed at a distance from each other, looking in the circumferential direction of the individual laminated core 11 to 11.5, so that a different angular position offset of the individual laminated cores 11 to 11.5 can be adjusted and identified in simple manner in this way. The desired offset of the angular position is advantageously made possible during the mounting of the laminated cores 11 to 11.5 by moving the features 31 to 36 of each marking 30 to 30.5 each time by a locking sleeve relative to each other.

As already mentioned above, FIGS. 13 and 14 show an orienting tool 40 which is used for the positioning of the individual laminated cores 11 to 11.5 or the individual metal sheets of a laminated core with respect to each other in terms of their angular position. The orienting tool 40 is advantageously a component of the clamping means 22, especially the individual positioning modules 23 to 23.5. Advantageously, each positioning module 23 to 23.5 has its own orienting tool 40. It is also conceivable for the orienting tool 40 to move along the individual positioning modules 23 to 23.5 in order to make possible a continuous orienting of the individual laminated cores 11 to 11.5 with respect to each other. The orienting tool 40 advantageously engages at least partially with markings 30 to 30.5 designed as notches, recesses or indentations, in order to enable a rotating and positioning of the laminated cores 11 to 11.5 or individual metal sheets of a single laminated core 11 to 11.5.

Figure 15:
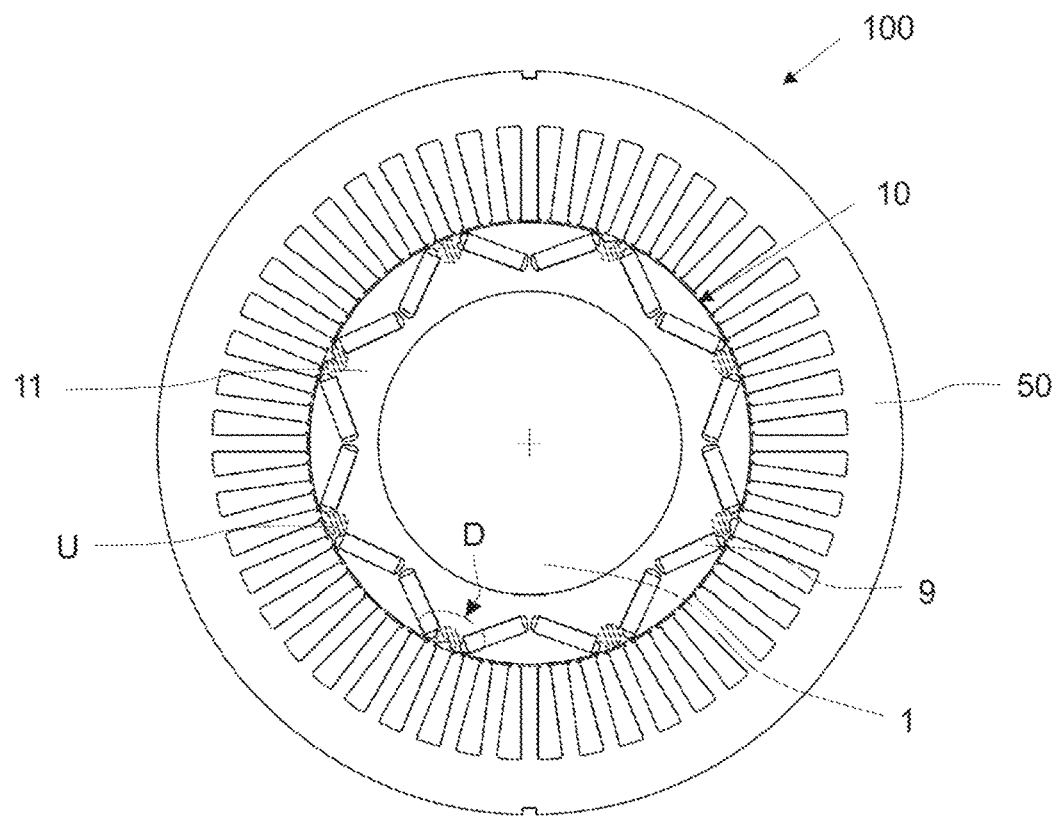
FIG. 15 is a top view of a cross section of an example electric machine to show non-magnetically active regions.

FIG. 15 shows in top view a cross section of one embodiment of an electric machine 100. The electric machine 100 has a rotor segment 10, having a rotor shaft 1 outfitted with at least one laminated core 11. The rotor segment 10 or the rotor shaft 1 is arranged inside a stator 50. Thanks to the magnetic field lines (not shown here) created on account of the arrangement of the winding (not shown here) and the permanent magnets arranged in the magnet pocket 9, which are formed during the operation of the electric machine 100. In particular, magnetically inactive regions are formed between the individual magnet pockets 9, which regions are designated by the reference U. These magnetically inactive regions U are advantageously at least minimized by means of the method according to the invention for the assembling of a rotor segment of an electric machine, especially advantageously they are not formed. In order to accomplish this, accordingly, the individual laminated cores 11 to 11.5 are arranged with an offset from each other in terms of their angular position. This means that the angular position offset of the individual metal sheets of a laminated core or individual laminated cores with respect to each other is adjusted in terms of the desired magnetic design. Accordingly, the flow of magnetic flux will advantageously be considered for the choice of the position of the markings 30 to 30.5 of the individual metal sheets or laminated cores 11 to 11.5. Especially advantageously, it is possible to configure and orient the markings 30 to 30.5 needed for the angular position orientation exactly in terms of their position and also advantageously in terms of their geometrical configuration so that the magnetic flux deflection can be influenced in a desired manner. Advantageously, therefore, the magnetic inactive regions U which extend basically at least partly around the magnet pockets 9 should be brought to saturation.

Figure 16:
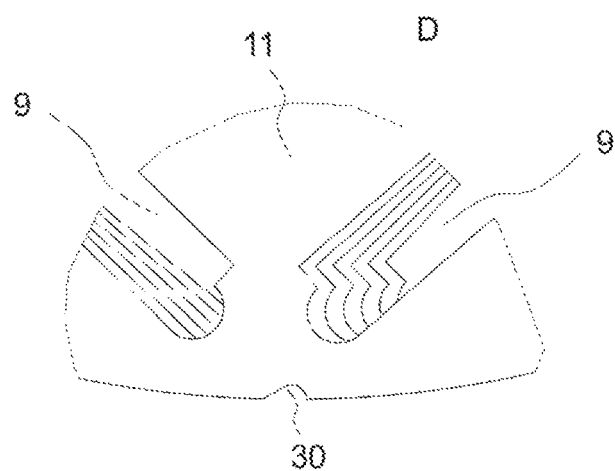
FIG. 16 is a detail view of an example feature T of FIG. 15.

FIG. 16 shows an enlargement of feature T, shown in FIG. 15. The angle offset of the individual laminated cores 11 to 11.5 arranged in succession is indicated here in the region of the magnet pockets 9, which consequently also have an angle offset with respect to each other. Streamlined shapes will be used advantageously for the configuration of the geometry of the convex or concave markings 30 to 30.5. Consequently, it is advantageous to consider the preferential direction of rotation—for example, in the case of a forward movement of a vehicle in which an electric machine is arranged with a rotor segment according to the invention—in order to produce the slightest possible turbulence in the diameter of the air gap. It is also conceivable to generate desired convective effects in the air gap by the geometrical configuration of the markings 30 to 30.5, such as eddies or flows for convective cooling.

LIST OF REFERENCE NUMBERS

1 Rotor shaft
2 Shaft segment
2.1 First distal end of shaft segment
2.2 Second distal end of shaft segment
2.3 First end face of shaft segment
2.4 Second end face of shaft segment
3 First material raising/first roller burnishing
4 Second material raising/second roller burnishing
5 First flange element
5.1 Recess of the first flange element
6 Second flange element
6.1 Recess of second flange element
7 Pressure element
7.1 Boreholes
7.2 Side surface
8 Internal toothing of first flange element
9-9.5 Magnet pocket
10 Rotor segment
11-11.5 Laminated core
12 Second pressure element
20 Assembly device
21 Orienting means
22 Clamping means
23-23.5 Positioning module
24 Chuck segment
25 Receiving segment
26 Receiving means
27 Receiving journal
28 Sensor means
30-30.5 Recess/marking
31-36 Features
40 Orienting tool
50 Stator
100 Electric machine 110-110.5 Through opening of the laminated core
111 Side surface of the laminated core
120 Through opening of the pressure element
H Line to show an orienting edge
L Longitudinal axis
M Assembly direction
U Nonmagnetically active regions.

What is claimed is:

1. A method for assembling a rotor segment of an electric machine, wherein the rotor segment includes a rotor shaft, at least one laminated core joined to the rotor shaft, and two pressure elements that clamp the at least one laminated core, the method comprising:
positioning the rotor shaft in an assembly device and orienting the rotor shaft using an orienting means of the assembly device;
positioning the at least one laminated core and at least one of the two pressure elements within a clamping means of the assembly device;
orienting an angular position of the at least one laminated core by way of at least one positioning module of the clamping means, wherein a quantity of the at least one positioning module corresponds to a quantity of the at least one laminated core being joined to the rotor shaft; and
moving the rotor shaft relative to the clamping means such that the at least one laminated core is pushed onto the rotor shaft and the at least one of the two pressure elements is connected to the rotor shaft
wherein the rotor shaft is premounted, wherein a shaft segment of the rotor shaft is connected to the at least one of the two pressure elements such that the at least one of the two pressure elements is disposed at a first distal end of the shaft segment.

2. The method of claim 1 comprising connecting the shaft segment to at least one of
a first flange element that is disposed on a first end face of the shaft segment, or
a second flange element that is disposed on a second end face of the shaft segment.

3. The method of claim 2 comprising positioning a receiving means, for receiving and guiding the rotor shaft, on the second flange element of the rotor shaft, wherein the receiving means is movable between the clamping means and the rotor shaft.

4. The method of claim 3 comprising moving the receiving means together with the rotor shaft along the clamping means.

5. A method for assembling a rotor segment of an electric machine, wherein the rotor segment includes a rotor shaft, at least one laminated core joined to the rotor shaft, and two pressure elements that clamp the at least one laminated core, the method comprising:
positioning the rotor shaft in an assembly device and orienting the rotor shaft using an orienting means of the assembly device;
positioning the at least one laminated core and at least one of the two pressure elements within a clamping means of the assembly device;
orienting an angular position of the at least one laminated core by way of at least one positioning module of the clamping means, wherein a quantity of the at least one positioning module corresponds to a quantity of the at least one laminated core being joined to the rotor shaft;
moving the rotor shaft relative to the clamping means such that the at least one laminated core is pushed onto the rotor shaft and the at least one of the two pressure elements is connected to the rotor shaft; and
moving the rotor shaft relative to the clamping means until the at least one laminated core makes contact with a pressure element that is premounted on the rotor shaft.

6. A method for assembling a rotor segment of an electric machine, wherein the rotor segment includes a rotor shaft, at least one laminated core joined to the rotor shaft, and two pressure elements that clamp the at least one laminated core, the method comprising:
positioning the rotor shaft in an assembly device and orienting the rotor shaft using an orienting means of the assembly device;
positioning the at least one laminated core and at least one of the two pressure elements within a clamping means of the assembly device;
orienting an angular position of the at least one laminated core by way of at least one positioning module of the clamping means, wherein a quantity of the at least one positioning module corresponds to a quantity of the at least one laminated core being joined to the rotor shaft;
moving the rotor shaft relative to the clamping means such that the at least one laminated core is pushed onto the rotor shaft and the at least one of the two pressure elements is connected to the rotor shaft; and
positioning the orienting means on a first flange element of the rotor shaft such that
a chuck segment of the orienting means encloses at least partly a section of the first flange element, or
a receiving segment of the orienting means engages at least partly with a recess of the first flange element.

7. A method for assembling a rotor segment of an electric machine, wherein the rotor segment includes a rotor shaft, at least one laminated core joined to the rotor shaft, and two pressure elements that clamp the at least one laminated core, the method comprising:
positioning the rotor shaft in an assembly device and orienting the rotor shaft using an orienting means of the assembly device;
positioning the at least one laminated core and at least one of the two pressure elements within a clamping means of the assembly device;
orienting an angular position of the at least one laminated core by way of at least one positioning module of the clamping means, wherein a quantity of the at least one positioning module corresponds to a quantity of the at least one laminated core being joined to the rotor shaft;
moving the rotor shaft relative to the clamping means such that the at least one laminated core is pushed onto the rotor shaft and the at least one of the two pressure elements is connected to the rotor shaft; and
detecting an angular position of a marking of the at least one laminated core with a sensor means of the clamping means.

8. A method for assembling a rotor segment of an electric machine, wherein the rotor segment includes a rotor shaft, at least one laminated core joined to the rotor shaft, and two pressure elements that clamp the at least one laminated core, the method comprising:
positioning the rotor shaft in an assembly device and orienting the rotor shaft using an orienting means of the assembly device;
positioning the at least one laminated core and at least one of the two pressure elements within a clamping means of the assembly device;

orienting an angular position of the at least one laminated core by way of at least one positioning module of the clamping means, wherein a quantity of the at least one positioning module corresponds to a quantity of the at least one laminated core being joined to the rotor shaft; and moving the rotor shaft relative to the clamping means such that the at least one laminated core is pushed onto the rotor shaft and the at least one of the two pressure elements is connected to the rotor shaft;

wherein the at least one laminated core comprises a plurality of laminated cores, wherein angular positions of the plurality of laminated cores are offset-able relative to one another, the method comprising adjusting the angular positions of the plurality of laminated cores by way of an orienting tool that positions the plurality of laminated cores with respect to one another based on a marking on each of the plurality of laminated cores.

9. The method of claim 8 comprising positioning the markings on the plurality of laminated cores with an angle offset relative to one another.

10. An assembly device for assembling a rotor segment of an electric machine, wherein the rotor segment includes a rotor shaft, at least one laminated core joined to the rotor shaft, and two pressure elements that clamp the at least one laminated core, the assembly device comprising:

an orienting means for orienting the rotor shaft in a defined assembly position; and a clamping means for positioning the at least one laminated core and at least one of the two pressure elements relative to the rotor shaft, the clamping means comprising at least one positioning module for orienting an angular position of the at least one laminated core relative to the rotor shaft, wherein a quantity of the at least one positioning module corresponds to a quantity of the at least one laminated core being joined to the rotor shaft wherein the orienting means comprises a chuck segment for partly enclosing and receiving a section of the rotor shaft, or a receiving segment for partly engaging with and receiving a section of the rotor shaft.

11. The assembly device of claim 10 wherein the clamping means is a chuck for receiving and positioning the at least one laminated core and the at least one of the two pressure elements.

12. The assembly device of claim 10 wherein the receiving segment is spring-loaded.

* * * * *